US012613095B1

(12) United States Patent
Levine

(10) Patent No.: US 12,613,095 B1
(45) Date of Patent: Apr. 28, 2026

(54) TECHNIQUES AND DEVICES FOR MOTION DETECTION

(71) Applicant: The Joan and Irwin Jacobs Technion-Cornell Institute, New York, NY (US)

(72) Inventor: David Levine, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days.

(21) Appl. No.: 19/198,785

(22) Filed: May 5, 2025

(51) Int. Cl.
G01C 21/16 (2006.01)

(52) U.S. Cl.
CPC .................................. G01C 21/185 (2020.08)

(58) Field of Classification Search
CPC .................................................... G01C 21/185
See application file for complete search history.

(56) References Cited

U.S. PATENT DOCUMENTS

| | | | | |
|---|---|---|---|---|
| 6,313,785 B1 * | 11/2001 | Mattox | ................... | G01S 7/292 342/115 |
| 8,314,732 B2 * | 11/2012 | Oswald | ................. | G01S 7/2926 342/195 |
| 11,274,544 B2 | 3/2022 | Peco et al. | | |
| 11,389,059 B2 | 7/2022 | Krueger | | |
| 11,504,051 B2 | 11/2022 | Krueger | | |
| 11,585,726 B2 * | 2/2023 | Fayfield | ............. | G05B 23/0289 |
| 2003/0023192 A1 | 1/2003 | Foxlin | | |
| 2010/0026623 A1 | 2/2010 | Moussavi | | |

| | | | | |
|---|---|---|---|---|
| 2011/0313716 A1 * | 12/2011 | Smid | .................. | G01C 21/1652 702/141 |
| 2012/0209532 A1 | 8/2012 | Liang et al. | | |
| 2014/0142871 A1 * | 5/2014 | Lombriser | ............... | G01H 1/00 702/56 |
| 2015/0318015 A1 * | 11/2015 | Bose | .................... | G08B 21/043 386/248 |

(Continued)

FOREIGN PATENT DOCUMENTS

EP          0870175 B1     11/2001

OTHER PUBLICATIONS

Eger, James Schipmann, Mauricio de Campos Porath, and Gustavo Daniel. A good-practices guideline for 6-DoF IMU-based dead-reckoning.

(Continued)

*Primary Examiner* — Tung S Lau
(74) *Attorney, Agent, or Firm* — M&B IP Analysts, LLC

(57)          ABSTRACT

A system and method for position detection. A method includes identifying a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data; determining a plurality of velocity values by integrating a portion of the plurality of acceleration values, wherein the portion of the plurality of acceleration values which is integrated in order to determine the plurality of velocity values excludes the plurality of stationary periods; and determining a plurality of positions by integrating at least a portion of the plurality of velocity values.

28 Claims, 8 Drawing Sheets

100

110

120

120

(56)                References Cited

U.S. PATENT DOCUMENTS

| | | | |
|---|---|---|---|
| 2016/0363460 A1 | 12/2016 | Sarbishei | |
| 2017/0307376 A1* | 10/2017 | Zihajehzadeh | ........ G06V 40/23 |
| 2018/0008141 A1 | 1/2018 | Krueger | |
| 2018/0139518 A1 | 5/2018 | Touma et al. | |
| 2020/0141733 A1 | 5/2020 | Ludwig | |
| 2023/0248454 A1 | 8/2023 | Miller et al. | |

OTHER PUBLICATIONS

Garcia, Mario, "Madgwick Orientation Filter," Attitude and Heading Reference Systems (2019) (available at: https://ahrs.readthedocs.io/en/latest/filters/madgwick.html) (last accessed Nov. 8, 2024, at 12:35 PM Eastern time).

Kummerle, J., Kuhner, T., & Lauer, M. (2018). Automatic calibration of multiple cameras and depth sensors with a spherical target. 2018 IEEE/RSJ International Conference on Intelligent Robots and Systems (IROS), 1-8. https://doi.org/10.1109/iros.2018.8593955.

Neto, Pedro et al., 3-D Position Estimation from Inertial Sensing: Minimizing the Error from the Process of Double Integration of Accelerations, CoRR abs/1311.4572 (2013).

Shastry, Abhishek et al., "Magic" Madgwick Filter for Attitude Estimation, Github (available at https://prgaero.github.io/Reports/p1a/rehmnicholas.pdf) (last accessed Oct. 2, 2024, at 10:17 AM Eastern time).

Tedaldi, David et al., "A Robust and Easy to Implement Method for IMU Calibration without External Equipments," Proceedings— IEEE International Conference on Robotics and Automation, Conference ICRA 2014 (Sep. 2013).

Wei, Z., Shao, M., Wang, Y., & Hu, M. (2013). A sphere-based calibration method for LINE Structured Light Vision Sensor. Advances in Mechanical Engineering, 5. https://doi.org/10.1155/2013/580417.

Yu, Chun, Ting-Yuan Huang, and Hsi-Pin Ma. "Motion analysis of football kick based on an IMU sensor." Sensors 22.16 (2022): 6244.

International Search Report for PCT/IB2025/054686, dated Aug. 21, 2025. Searching Authority, Israel Patent Office, Jerusalem, Israel.

Written Opinion of the Searching Authority for PCT/IB2025/054686, dated Aug. 21, 2025. Searching Authority, Israel Patent Office, Jerusalem, Israel.

* cited by examiner

100

110

120

120

TECHNIQUES AND DEVICES FOR MOTION DETECTION

TECHNICAL FIELD

The present disclosure relates generally to motion detection, and more specifically to detecting motions in three-dimensional space via techniques which may be realized via sensors disposed in wearable devices.

BACKGROUND

Motion sensors such as accelerometers and gyroscopes may be utilized to track motion of objects including these sensors. Accordingly, these and other motion sensors may sometimes be included in wearable devices in order to allow for tracking motions of people wearing those devices. Tracking motion of people is a technical challenge, particularly when attempting to track motion of specific parts of the human body such as arms and legs.

Existing solutions face many challenges with error and bias, which can cause sensor signals measured via wearable devices to result in inaccurate motion detection. Configurations with additional and/or more sophisticated sensors can sometimes help mitigate these challenges, but are more expensive and may result in wearable devices that are bulky and unwieldy.

In particular, some existing solutions use marker-based optical systems for biomechanical analyses. These solutions typically require expensive equipment, have notable environmental restrictions, and may only work well or otherwise be compatible with adult athletes such that they are unsuitable for children.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for position detection. The method comprises: identifying a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data; determining a plurality of velocity values by integrating a portion of the plurality of acceleration values, wherein the portion of the plurality of acceleration values which is integrated in order to determine the plurality of velocity values excludes the plurality of stationary periods; and determining a plurality of positions by integrating at least a portion of the plurality of velocity values.

Certain embodiments disclosed herein also include a non-transitory computer readable medium having stored thereon causing a processing circuitry to execute a process, the process comprising: identifying a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data; determining a plurality of velocity values by integrating a portion of the plurality of acceleration values, wherein the portion of the plurality of acceleration values which is integrated in order to determine the plurality of velocity values excludes the plurality of stationary periods; and determining a plurality of positions by integrating at least a portion of the plurality of velocity values.

Certain embodiments disclosed herein also include a system for position detection. The system comprises: a processing circuitry; and a memory, the memory containing instructions that, when executed by the processing circuitry, configure the system to: identify a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data; determine a plurality of velocity values by integrating a portion of the plurality of acceleration values, wherein the portion of the plurality of acceleration values which is integrated in order to determine the plurality of velocity values excludes the plurality of stationary periods; and determine a plurality of positions by integrating at least a portion of the plurality of velocity values.

Certain embodiments disclosed herein include the method, non-transitory computer readable medium, or system noted above or below, further including or being configured to perform the following step or steps: applying a first set of filters to the plurality of sample groupings in order to create a set of filtered sample groupings, wherein the plurality of stationary periods is identified based further on the set of filtered sample groupings.

Certain embodiments disclosed herein include the method, non-transitory computer readable medium, or system noted above or below, wherein the first set of filters includes a high-pass Butterworth filter and a low-pass Butterworth filter.

Certain embodiments disclosed herein include the method, non-transitory computer readable medium, or system noted above or below, further including or being configured to perform the following step or steps: applying a second set of filters to the plurality of velocity values in order to obtain a set of filtered velocity values, wherein the at least a portion of the plurality of velocity values is the set of filtered velocity values.

Certain embodiments disclosed herein include the method, non-transitory computer readable medium, or system noted above or below, further including or being configured to perform the following step or steps: removing offset bias from the plurality of samples in order to produce a plurality of bias-corrected acceleration values by determining an averaged acceleration value of a subset of the plurality of samples and subtracting the averaged acceleration value from the plurality of acceleration values, wherein the portion of the plurality of acceleration values is the plurality of bias-corrected acceleration values.

Certain embodiments disclosed herein include the method, non-transitory computer readable medium, or system noted above or below, further including or being configured to perform the following step or steps: measuring an effect of gravity upon the sensor data during a stationary period, wherein the at least one sensor is stationary during the stationary period; and adjusting the plurality of acceleration values based on the effect of gravity in order to create a set of gravity-compensated acceleration values, wherein the portion of the plurality of acceleration values is the set of gravity-compensated acceleration values.

Certain embodiments disclosed herein include the method, non-transitory computer readable medium, or system noted above or below, further including or being configured to perform the following step or steps: creating an acceleration vector for each of the plurality of sample groupings; and determining a magnitude of the acceleration vector for each of the plurality of sample groupings, wherein each stationary period is one of the plurality of groupings for which the magnitude of the acceleration vector is below a predetermined threshold.

Certain embodiments disclosed herein include the method, non-transitory computer readable medium, or system noted above or below, further including or being configured to perform the following step or steps: generating a three-dimensional motion trajectory based on the plurality of positions.

Certain embodiments disclosed herein include the method, non-transitory computer readable medium, or system noted above or below, further including or being configured to perform the following step or steps: generating at least one form correction output by comparing the generated three-dimensional motion trajectory to at least one target motion trajectory.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
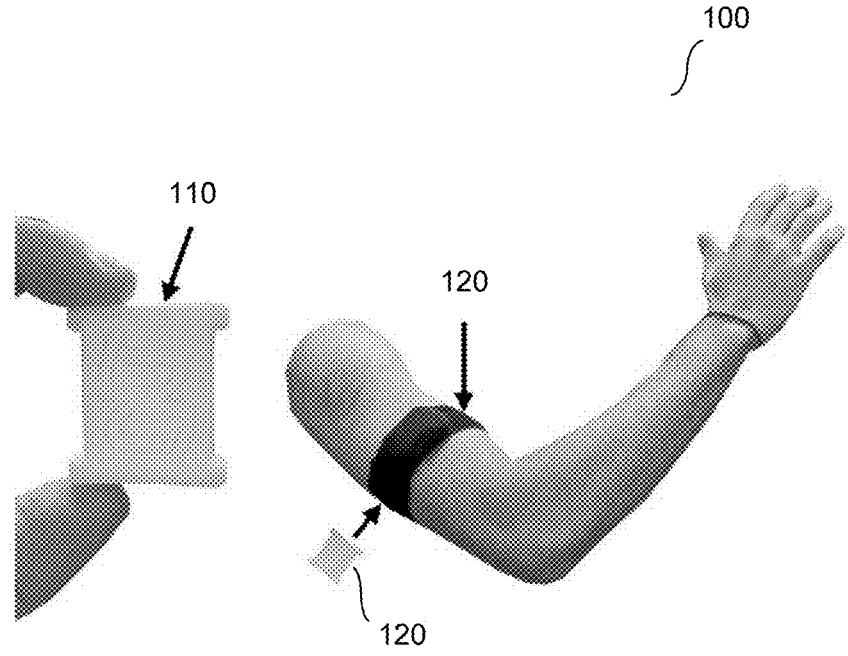
FIG. 1 is an illustration showing a wearable device utilized to describe various disclosed embodiments.

The various disclosed embodiments include techniques for motion detection and devices configured for motion detection. In particular, various disclosed embodiments may allow for measuring three-dimensional motion trajectories in real-time. Various disclosed embodiments may be utilized with a wearable inertial sensor device containing sensors such as, but not limited to, an accelerator and gyroscope, in order to detect motion and measure motion trajectories accurately with a device that may be designed to be lightweight, inexpensive, portable, and flexible-to-deploy device.

The disclosed embodiments allow for performing motion detection and, in particular, enable motion detection for wearable devices which can be realized using fewer or less powerful components such as sensors than existing solutions while maintaining accuracy. Such wearable devices may therefore enable use cases requiring fine granularity measurements relative to a wearer's motion. As a non-limiting example, such measurements may be utilized to measure fine-grained motion in limbs (e.g., arms or legs), and may be applied to use cases such as, but not limited to, analyzing sports performance or other performance related to moving arms and legs.

Various disclosed embodiments provide an improved dead reckoning process for generalized three-dimensional motion trajectories which include improvements with respect to sensor drift, noise, and stationary sensor states. This improved dead reckoning process may enable using a single 6 degree of freedom (DOF) inertial sensor (i.e., exactly one 6 DOF sensor and no other sensors) to detect a wider range of motions than would otherwise be possible using existing solutions. As a non-limiting example, high intensity motions such as those commonly seen in sports like baseball and softball may be detected accurately using a single 6 DOF sensor in accordance with various disclosed embodiments.

In an embodiment, one or more signal processing filters are applied to acceleration magnitude values for a device including a 6 DOF inertial sensor, and stationary periods are determined for the device based on the filtered acceleration magnitude values. The filtered acceleration magnitude values may be corrected for bias. The filtered acceleration magnitude values are integrated into a set of velocity values, which in turn are integrated into a set of position values. Additional filtering may be performed on the velocity values, the position values, or both, in order to further improve the values before subsequent processing. The resulting set of position values may be utilized to build a three-dimensional motion trajectory for the device. The three-dimensional motion trajectory, in turn, may be utilized for purposes such as, but not limited to, providing form correction data to a wearer of the device based on the three-dimensional motion trajectory and a target motion trajectory for a given motion.

More specifically, at least some of the filters may be or may include filters used to filter out values below respective thresholds which may represent subtle motions that may act as noise. Applying filters to both the acceleration values and the velocity values in a cascaded filtering approach before integrating into velocity values and position values, respectively, may allow for selectively integrating the values during periods of motion, which in turn prevents or otherwise reduces the accumulation of drift throughout the integration steps. Accordingly, this cascaded filtering approach may allow for systematically removing low-frequency drift and noise, thereby providing more robust noise and drift reduction. Further, the cascaded filtering steps may be coupled with complementary techniques such as bias removal and stationary motion detection in order to further reduce drift and noise.

In a further embodiment, stationary periods are detected before integrating acceleration values into velocity values. The stationary periods may be periods having an acceleration magnitude value below a predetermined threshold. In yet a further embodiment, the predetermined threshold is 0.025 meter/second squared (m/s²). In this regard, it is noted that a low acceleration threshold may allow for avoiding unnecessary zeroing of subtle motions which might be useful for more accurately integrating acceleration values, and it has been identified that 0.025 m/s² is a sufficiently low threshold for at least some implementations involving detection of motion of limbs or other 3D motion detection.

In some embodiments, the acceleration values to be used for detecting stationary periods are grouped into groupings, with each grouping including multiple acceleration values. As a non-limiting example, each grouping may be a window including 15 acceleration values. Each grouping may be processed via one or more filters. Each grouping having a magnitude value below the threshold may be determined as a stationary period grouping, and the acceleration values of each stationary period grouping may be excluded from integration. The magnitude value may be or otherwise may be determined based on a magnitude of a vector including the acceleration values of a given grouping.

In this regard, it is noted that some existing solutions for biomechanical analyses may require expensive equipment and environmental or subject limitations which restrict flexibility of deployment, for example, by only being capable of being deployed with athletes having certain physical characteristics (for example, above a certain age only or otherwise athletes of a certain adult size only) or by only being capable of use with certain body parts. The disclosed embodiments may be used with fewer and less sophisticated sensors, thereby allowing for using devices which are less powerful and require fewer computing resources as well as allowing for flexibly deployment on athletes of different ages and skill levels. For example, various disclosed embodiments may be realized using only a single 6 degree of freedom (DOF) inertial sensor.

In particular, some existing solutions leverage the detection of stationary periods in order to selectively integrate velocity values in order to reduce drift. For example, some existing solutions may identify periods in which a series of sampling points is below a velocity threshold in order to detect stationary periods to avoid integrating into position values. However, detecting stationary periods based on velocity values after integration to velocity may result in accumulation of systematic errors due to drift, which can lead to further accumulation of errors during the next integration. Accordingly, leveraging the detection of stationary periods in acceleration data as described herein allows for reducing error accumulation, thereby providing more accurate motion detection. Moreover, using windows before integration of acceleration values into velocity values may further mitigate drift errors.

The various disclosed embodiments may therefore be useful for a variety of implementations, including and in particular sports applications. Sports often involve players moving their limbs quickly and with sharp changes which may be difficult to detect without extensive sensor hardware. However, such extensive sensor hardware is expensive (both in terms of financial cost and computational expenses) as well as unwieldy (that is, difficult to wear on an athlete's body without the sensors themselves significantly affecting performance). The disclosed embodiments therefore may aid in realizing motion detection for implementations in sports such as, but not limited to, baseball, softball, golf, tennis, pickleball, basketball, American football, soccer, and the like.

FIG. 1 is an illustration 100 showing a wearable device utilized to describe various disclosed embodiments.

In an embodiment, the wearable device 100 is realized via an inertial measurement unit (IMU) 110 disposed in a wearable band 120. In accordance with various disclosed embodiments, the IMU includes sensors (not shown in FIG. 1) such as, but not limited to, an accelerometer and a gyroscope. In the example implementation shown in FIG. 1, the wearable band 120 is an arm band. The wearable band 120 may be placed on a body part of a subject, for example, on a limb such as an arm or leg of the subject, in order to allow the IMU 110 to capture sensor signals to be used for calculating acceleration data related to acceleration of movement of the body part it is placed upon. The acceleration data may be used to determine position values in order to build motion trajectories as described herein.

Figure 2:
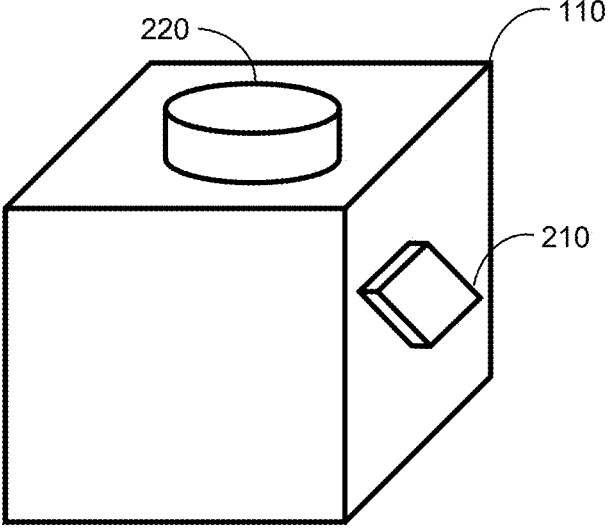
FIG. 2 is an illustration showing an inertial measurement unit which may be utilized in accordance with various disclosed embodiments.

FIG. 2 is an illustration showing an inertial measurement unit (IMU) 110 which may be utilized in accordance with various disclosed embodiments.

As shown in FIG. 2, the IMU 110 includes an accelerometer 210 and a gyroscope 220. The accelerometer 210 is configured to measure acceleration of the IMU 110, for example, by measuring proper acceleration in the form of a rate of change of velocity of the IMU 110 relative to an inertial frame of reference (for example, relative to an observer who is in free fall). The gyroscope 220 is configured to measure orientation and angular velocity, for example, in order to measure rotational rate.

It should be noted that the IMU 110 shown in FIG. 2 may be utilized in accordance with some embodiments, but at least some of the disclosed embodiments may utilize IMUs which are configured differently. In particular, IMUs with multiple accelerometers, multiple gyroscopes, additional sensors (for example, magnetometers), or a combination thereof, may be utilized in accordance with at least some disclosed embodiments.

Figure 3:
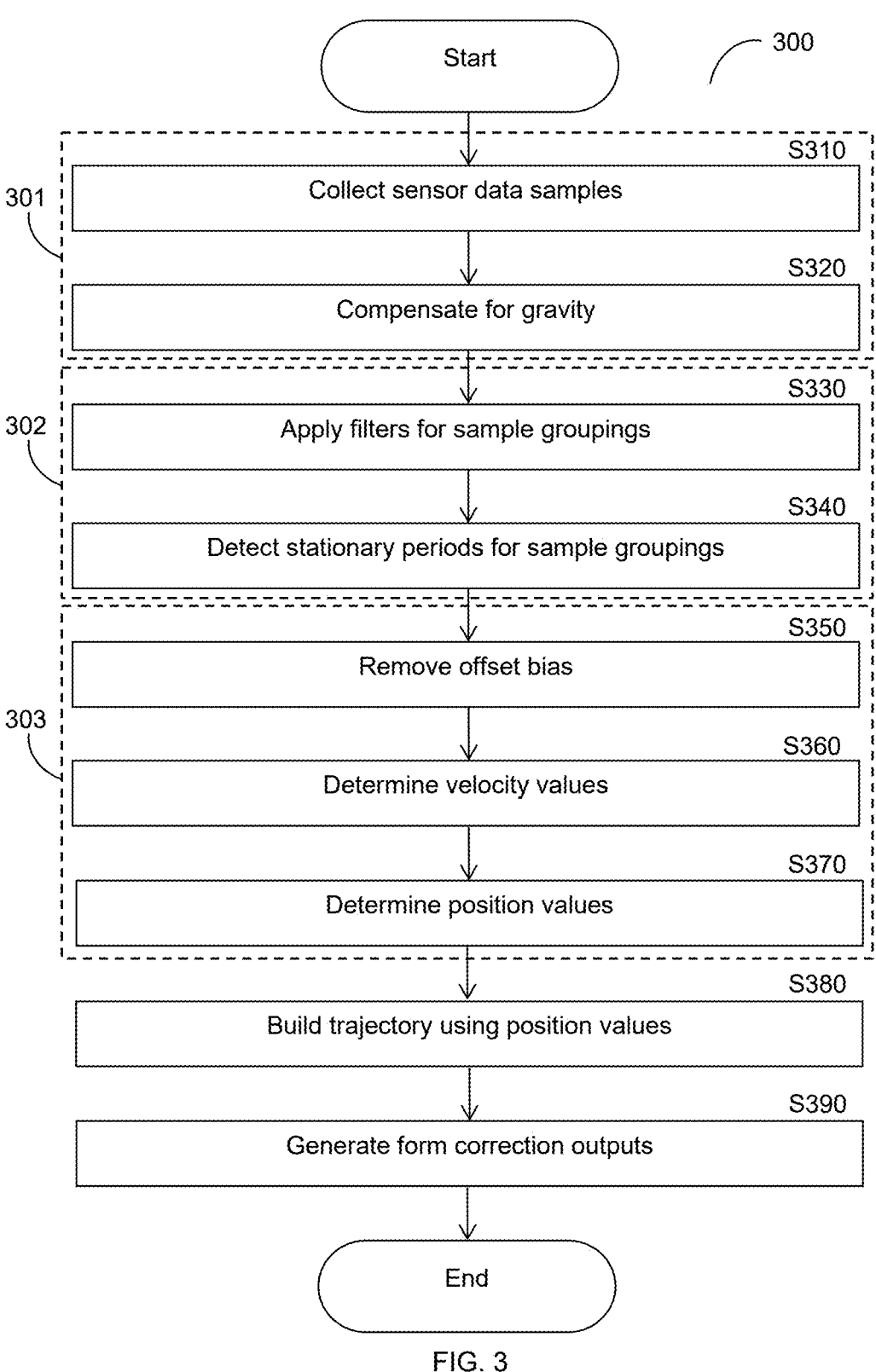
FIG. 3 is a flowchart illustrating a method for motion detection according to an embodiment.

FIG. 3 is a flowchart 300 illustrating a method for motion detection according to an embodiment. In an embodiment, the method is performed by the motion detection system 800, FIG. 8. Such a motion detection system may be installed in or otherwise deployed with respect to a wearable device such as, but not limited to, the wearable device 100, FIG. 1.

In accordance with various disclosed embodiments, the process performed in FIG. 1 may be performed in phases. During each phase, processing of samples may be performed according to different organizational schemes. To this end, in a further embodiment, such organization schemes may be or may include, but are not limited to, processing samples individually, processing samples in subsets or other groupings such as windows, and processing the sample set as a whole.

In yet a further embodiment, processing sensor data in order to determine position values may proceed in three phases. FIG. 3 illustrates processing according to such an embodiment. As shown in FIG. 3, a first phase 301 includes steps S310 and S320, a second phase 302 includes steps S330 and S340, and a third phase 303 includes steps S350 through S370. In an embodiment, the first phase 301 is performed per sample (that is, each step of the phase is performed on each sample individually), the second phase 302 is performed for windows or other groupings representing subsets of the entire set of samples (that is, each step is performed with respect to each such grouping), and the third phase 303 is performed for the entire sample set (that is, each step is performed with respect to the entire set of samples).

Performing steps S310 and S320 during the first phase 301 at the sample level (i.e., per sample) allows for preserving rapid motion details, which may allow for more accurately determining position in subsequent steps. Performing steps S3340 and S340 during the second phase at the grouping level (i.e., per grouping of samples) allows for determining stationary periods which may allow for more accurately detecting stationary activity than sample level stationary analysis. Performing steps S350 through S370 for the entire sample set allows for addressing longer term systematic errors from sensor drift globally, which can allow for resulting position values which are more accurate, particularly when combined with the activities used to correct for drift on the acceleration data, the velocity data, or both.

It should be noted that FIG. 3 is depicted as having a particular set of three phases, but that some of the disclosed embodiments are not limited to such an implementation. A different number of phases, a different order of phases, processing samples according to different organizational schemes in any or all of the phases, and the like, may be utilized without departing from the scope of the disclosure in accordance with certain embodiments.

At S310, a set of samples of sensor data is collected. In an embodiment, the sensor data is or includes accelerometer data (for example, linear acceleration data) and gyroscope data (for example, angular velocity or rotational rate data), and the samples are determined using the sensor data. As a non-limiting example, each sample may be determined based on a value measured or otherwise captured by an accelerometer and a value measured by a gyroscope at a given moment in time, where the accelerometer value and the gyroscope value for each sample represent the linear acceleration and angular velocity, respectively, at that time. In a further embodiment, each sample is an acceleration vector representing acceleration in three-dimensional (3D) space at a given moment in time. In an embodiment, the set of samples is collected during an initial stationary period in which the sensor or sensors are not moving. As a non-limiting example, the set of samples may be a set of 1000 samples collected during the stationary period at periodic intervals.

The accelerometer data and gyroscope data may be utilized to determine acceleration data for acceleration in three-dimensional (3D) space. To this end, in an embodiment, S310 further includes determining each sample, for example, by determining an acceleration vector based on the linear acceleration value and angular velocity values at the moment in time corresponding to the sample.

In an embodiment, the sensor data includes sensor data collected via an inertial measurement unit (IMU). In a further embodiment, such an IMU is an electronic device that measures values at least representing force and angular rate of a body and includes one or more accelerometers as well as one or more gyroscopes. In yet a further embodiment, IMU is a six degree of freedom (DOF) inertial sensor system. In some embodiments, the sensor data includes only sensor data collected by a single IMU and not by other sensors or sensor systems. In an even further embodiment, sensors of the single IMU consist of one accelerometer and one gyroscope. As discussed herein, various disclosed embodiments allow for improving accuracy of measurements and reduction of effects such as noise and drift which may allow for achieving suitable degrees of accuracy using only a single IMU or otherwise with a reduced number of sensors or sensor systems as compared to at least some other solutions. However, it should be noted that other numbers of sensor systems, sensors, or both, may be equally utilized in accordance with at least some disclosed embodiments.

At S320, values of the samples are adjusted in order to compensate for gravity, that is, to compensate for the effects of gravity upon the sensor used to capture the sensor data. In an embodiment, compensating for gravity includes measuring an effect of gravity upon sensor data during a stationary period in which a device including the sensor is stationary, transforming acceleration data among the sensor data from a local frame to a world frame, and adjusting values to remove gravity. In some embodiments, S320 may further include correcting for tilt error to further improve the gravity-compensated acceleration values.

An example process for compensating for gravity which may be utilized at S320 is described further below with respect to FIG. 4.

At S330, a first set of filters is applied to the samples in order to obtain a set of filtered sample groupings or otherwise to obtain a set of filtered samples. In an embodiment, the first set of filters is applied with respect to groupings of samples such as, but not limited to, windows of samples defined via respective time periods. That is, each grouping of samples may include samples corresponding to times within a respective time period. The first set of filters may be or may include one or more signal processing filters configured to filter out samples having values which are above a threshold, below a threshold, or both. The set of filtered sample groupings may be a subset of groupings of the samples, for example, a portion of the windows of the samples.

In an embodiment, the first set of filters includes at least one Butterworth filter. Such a Butterworth filter may be a signal processing filter having a passband and a stopband that has a flat frequency response in the passband and that rolls off toward zero in the stopband. Such a Butterworth filter may be realized as a high-pass filter (i.e., a high-pass Butterworth filter) or as a low-pass filter (i.e., a low-pass Butterworth filter). A high-pass filter may allow signals with a frequency above a threshold (cut-off) frequency to pass, while a low-pass filter may allow signals with a frequency below a threshold (cut-off) frequency to pass. To this end, in a further embodiment, the first set of filters includes a high-pass Butterworth filter and a low-pass Butterworth filter. In yet a further embodiment, the high-pass Butterworth filter passes signals above a first predetermined threshold, and the low-pass Butterworth filter passes signals below a second predetermined threshold.

At S340, stationary periods are detected based on the set of filtered samples. In an embodiment, each stationary period is a period of time representing a lack of movement of a device including the sensors used to collect the sensor data. In a further embodiment, each stationary period is a period of time corresponding to a respective grouping of acceleration values having an acceleration magnitude value below a predetermined threshold. In some embodiments, the predetermined threshold is 0.025 meters per second squared $(m/s^2)$. The magnitude value may be or otherwise may be determined based on a magnitude of a vector including the acceleration values of a given grouping.

In an embodiment, the stationary periods are detected based on the groupings of samples. In a further embodiment, each grouping of samples among the set of filtered samples is determined to be either stationary or non-stationary, and the time period corresponding to each grouping determined to be stationary is detected as a stationary period.

To this end, in yet a further embodiment, acceleration values are grouped into groupings, with each grouping including multiple acceleration values. As a non-limiting example, each grouping may be a window defined with respect to time of capture of acceleration values and include 15 acceleration values. The acceleration values of each grouping may be arranged in a vector, and a magnitude of such a vector for a given grouping may be used as the acceleration magnitude value for the grouping to be checked against the threshold in order to determine whether the grouping represents a stationary period. That is, in an embodiment, an acceleration vector including the acceleration values is created for each grouping, and an acceleration magnitude value is determined for each grouping by determining a magnitude of the acceleration vector created for the grouping.

As noted above and as depicted in the embodiment shown in FIG. 3, the stationary periods are detected before integrating acceleration values into velocity values. Detecting stationary periods and selectively integrating to avoid integrating the stationary periods may improve accuracy of any resulting position values. Moreover, detecting stationary periods before the first integration from acceleration to velocity may further improve accuracy of resulting position values as compared to detecting stationary periods only after that first integration (for example, between the first integration and a second integration from velocity to position).

Additionally, using stationary periods based on windows or other groupings of samples may improve motion detection as compared to at least some other approaches. In particular, some approaches utilize a simpler threshold-based approach before integration in which each sample having an acceleration values below a threshold is filtered out. While this simplified approach is computationally efficient, the losses in accuracy and granularity when filtering out individual samples may render that approach unsuitable for certain use cases. Specifically, that approach tends to perform poorly for many types of motion and may therefore fail to accurately measure certain kinds of movement. Moreover, using individual acceleration values may result in subtle motions being "zeroed" and filtered out, which in turn may lead to artificial discontinuities in motion trajectory that can lead to further inaccuracies in the resulting position values. Using stationary periods as described herein may avoid at least some of these issues, thereby producing more accurate motion detection results even for different kinds of movement.

At S350, offset bias is removed from the samples. In an embodiment, removing the offset bias from the samples includes subtracting an averaged acceleration value from acceleration values of acceleration vectors representing acceleration of the samples. In a further embodiment, each such acceleration vector includes multiple acceleration values such as, but not limited to, acceleration values in the X, Y, and Z axes (i.e., such that each acceleration vector at least represents acceleration of the sensor system in 3D space).

To this end, in such an embodiment, the averaged acceleration value is subtracted from each of the multiple acceleration value of each acceleration vector in order to produce a set of offset bias-corrected acceleration vectors. The averaged acceleration value may be determined by determining a mean or otherwise average value of the acceleration of a certain number of samples among a subset of the samples and, in particular, a certain number of samples which were captured or otherwise collected first among the samples in time order. As a non-limiting example, the first 10 samples among the samples (i.e., the 10 samples which were collected before all other samples among the samples) may be lected before all other samples among the samples) may be utilized to determine the averaged acceleration value.

As a non-limiting example, an average may be determined for the first 10 samples of stationary sensor acceleration data (when organized with respect to time of capture) and subtracted from the acceleration data. More specifically, a mean or otherwise average acceleration value determined based on the first 10 samples may be subtracted from each acceleration value in each acceleration vector, for example the acceleration values representing acceleration along the X, Y, and Z axes represented in each acceleration vector. The resulting bias-corrected acceleration vectors are therefore adjusted to remove offset bias.

Removing offset bias by averaging a certain number of samples and subtracting the averaged acceleration value from the acceleration vectors removes offset bias in a manner which is more robust to different calibration methods than at least some other solutions. In particular, adjusting values to remove offset bias in addition to compensating for gravity allows for further improving the resulting bias-corrected acceleration values, thereby allowing for more accurately determining velocity values and position values based on the acceleration values even. More specifically, the offset bias correction may be robust to a wider variety of different calibration methods such that the resulting bias-corrected acceleration values are, on average, more accurate when different calibration methods are used as compared to at least some existing solutions.

At S360, velocity values are determined based on acceleration values of the set of samples. In an embodiment, determining the velocity values includes integrating the acceleration values resulting from any or all of the foregoing steps. For the reasons discussed herein, the acceleration values are processed in ways which remove bias and other potential sources of error such that the resulting velocity values determined by integrating those acceleration values are more accurate even for less complex sensor systems.

In an embodiment, the velocity values are determined by selectively integrating acceleration values among the set of samples. More specifically, in a further embodiment, acceleration values of samples among the determined stationary periods are not integrated. In other words, in such an embodiment, only acceleration values of samples among non-stationary periods are integrated. As noted above, detecting stationary periods in acceleration data prior to integration allows for reducing the accumulation of systematic errors due to drift, which in turn can result in more accurately determining position values used to detect motion.

In an embodiment, the integration of the acceleration values is performed using a trapezoidal integration, that is, integration based on the trapezoidal rule. It should be noted that other forms of integration may be utilized in accordance with at least some disclosed embodiments. Such a trapezoidal integration may approximate an area under a curve via trapezoids.

At S370, position values are determined based on the velocity values. In an embodiment, determining the position values includes integrating at least a portion of the velocity values in order to obtain respective position values. In a further embodiment, stationary periods are identified based on the stationary groupings of acceleration values as discussed above, and integration is avoided for velocity values corresponding to acceleration values among the stationary groupings. That is, the velocity values corresponding to acceleration values among the stationary groupings are not integrated into position values. In an embodiment, the resulting position values are defined with respect to a previous position of the device including the sensors used to capture the acceleration values. That is, the position values may be relative position values or may otherwise be defined with the original position of the device as the origin.

In some embodiments, additional filtering is performed before integrating velocity values into position values, after integrating velocity values into position values, or both. That is, a second set of filters may be applied to the velocity values in order to obtain filtered velocity values to be integrated, a third set of filters may be applied to the position values determined via integration, or both. Each additional stage of filtering may be used to remove further noise, bias, or other potential sources of error.

An example process for determining position values which may be utilized at S370 is described further below with respect to FIG. 5.

At S380, a motion trajectory is built using the determined position values. In an embodiment, the motion trajectory is a three-dimensional (3D) motion trajectory including multiple points representing different positions in space of a given subject or portion thereof (for example, a body part such as an arm or leg). The motion trajectory may include a set of points in 3D space corresponding to respective position values determined as discussed above. Accordingly, the motion trajectory may include or otherwise represent the motion path of the device including the sensors used to capture the sensor data, which in turn may effectively represent the motion path of the body part of the subject on which the device is disposed (for example, an arm or a leg on which a wearable device is worn).

In an embodiment, the motion trajectory is built further based on a known previous position of the device. That is the position values may be defined with respect to such a previous position of the device, and dead reckoning techniques may be applied in order to determine positions of the device at different points along the motion trajectory based on the position values and the previous position of the device.

At optional S390, form correction outputs are generated based on the motion trajectory. In an embodiment, generating the form correction outputs includes comparing the motion trajectory to one or more predetermined target motion trajectories illustrating "correct" or otherwise desirable form for certain motions (for example, motions associated with certain activities like swinging, serving, or throwing). That is, a first motion trajectory built as discussed above may be compared to one or more second motion trajectories which represent target motion trajectories. The form correction outputs may be determined based on such a comparison and, in particular, based on one or more differences between the motion trajectory and one or more of the target motion trajectories.

The form correction outputs may be or may include, but are not limited to, data points showing positions at which the motion trajectory deviated from a target motion trajectory, text or other natural language outputs indicating proposed changes to form which might correct or otherwise avoid such deviations, both, and the like. Such text or other natural language outputs may be, but are not limited to, predetermined outputs associated with respective deviations. The deviations may be defined with respect to differences in values, certain positions within target motion trajectories, certain types of motions (for example, motions represented by certain target motion trajectories), combinations thereof, and the like. To this end, in an embodiment, generating the form correction outputs may include applying a predetermined set of form correction rules based on the deviations.

The target motion trajectories may be or may include, but are not limited to, motion trajectories representing desired or otherwise target motions to be emulated. Deviations from these target motions may therefore represent imperfect or incorrect form to be potentially corrected. To this end, the target motion trajectory may be selected based on the use case defined with respect to factors such as, but not limited to, type of motion to be improved (for example, swinging a bat, throwing a ball, swinging a racket, kicking, throwing a punch, swinging a club, walking, running, serving a ball, etc.), height or otherwise size of the performer (for example, height of an athlete or other wearer of a wearable device as discussed herein), build of the performer, age of the performer, combinations thereof, and the like.

Alternatively, the target motion trajectory may be determined based on a comparison between the motion trajectory built at S380 and a predetermined set of potential target motion trajectories, for example, target motion trajectories representing correct or otherwise target form for different types of motions, motions performed by performers having different heights, motions performed by performers having different builds, motions performed by performers of different ages, combinations thereof, and the like. More specifically, in at least some embodiments, the motion trajectory may be compared to the set of potential target motion trajectories in order to select one or more target motion trajectories from among the set of potential target motion trajectories to be used for generating the form correction outputs. The selected target motion trajectories may be, for example but not limited to, motion trajectories which have the best fit to the motion trajectory built at S380 from among the set of potential target motion trajectories. That is, in such an embodiment, the built motion trajectory may be matched to the potential target motion trajectories (for example, by comparing distances between points of the trajectories) in order to determine one or more matching potential target motion trajectories (for example, trajectories which match the built motion trajectory above a predetermined threshold or otherwise match the best among the potential target motion trajectories), where the matching potential target motion trajectories are selected as the target motion trajectories to be used for generating the form correction outputs.

Figure 4:
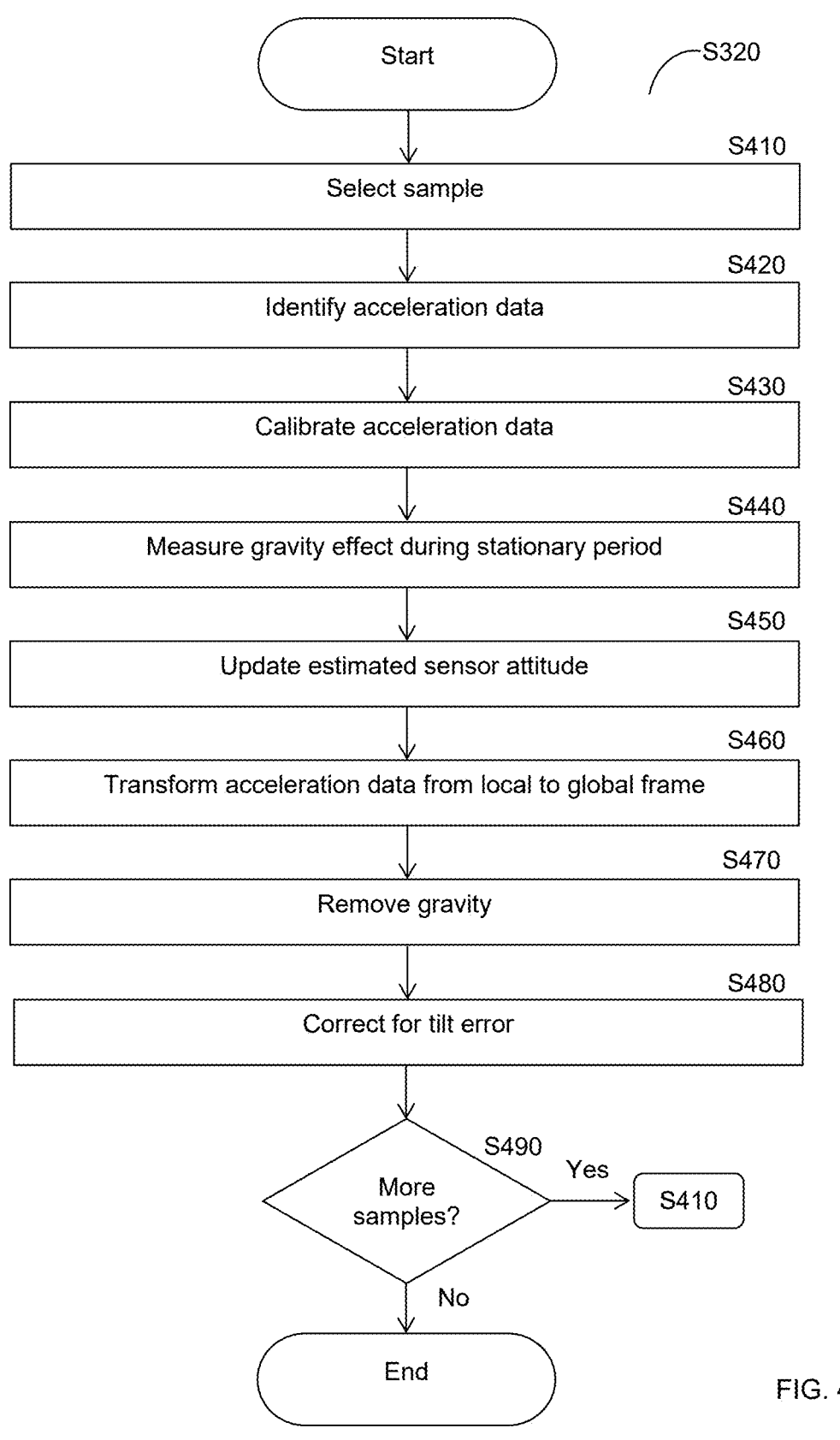
FIG. 4 is a flowchart illustrating a method for compensating for gravity according to an embodiment.

FIG. 4 is a flowchart S320 illustrating a method for compensating for gravity according to an embodiment.

At S410, a sample is selected. In an embodiment, the sample is selected from among a set of samples determined based on sensor data such as, but not limited to, sensor data collected via an inertial measurement unit (IMU). In a further embodiment, the sample is or includes acceleration data in the form of values representing acceleration of the sensors or sensor device in 3D space. In yet a further embodiment, the sample may be realized as an acceleration vector including values representing acceleration along the X, Y, and Z axes.

At S420, acceleration data of the sample is identified. In an embodiment, the acceleration vector of each sample is identified as the acceleration data of the sample.

At S430, the acceleration data is calibrated. In an embodiment, calibrating the acceleration data includes determining a calibration scheme for calibrating the sensors used to capture the sensor data of the acceleration data, and applying the calibration scheme to the values of the acceleration vector of the sample in order to obtain a calibrated acceleration vector including calibrated acceleration values. In some embodiments, the acceleration data is calibrated using a modified sphere approach based on measurements of an effect of gravity on calibrated acceleration data during an initial stationary measurement period.

An example process for sensor calibration which may be utilized to determine calibration parameters for calibrating a sensor which may be utilized to calibrate the acceleration data in some embodiments is described further below with respect to FIG. 6.

At S440, an effect of gravity on the acceleration data is measured for a stationary period. In an embodiment, measuring the effect of gravity includes positioning the sensor in a stationary position in which the sensor is not moving (for example, by holding the sensor in place) and recording, by the sensor acceleration samples (as a non-limiting example, collecting 1000 samples in this position). As a non-limiting example, sensor data collected during an initial stationary period in which the sensor is in the stationary position such as the collection discussed above with respect to S310 in accordance with at least some embodiments may be utilized. The effect of gravity is determined based on the samples collected while the sensor is in this position, and may be utilized during subsequent processing. In a further embodiment, the sensor is held with an IMU facing upward (positive Z direction orientation).

In an embodiment, the samples collected at S440 are calibrated using the determined calibration scheme in order to produce a set of calibrated samples to be used for determining the effect of gravity, and an average vector is determined based on the set of calibrated samples to be used for determining the effect of gravity. The average vector may be or may include a set of values (for example, a set of 3 values representing acceleration along the X, Y, and Z axes), where each value is an average of a corresponding value of vectors representing the samples (for example, an average of X-axis acceleration values, an average of Y-axis acceleration values, and an average of Z-axis acceleration values). As a non-limiting example, the resulting average acceleration vector may be represented as $<X_{avg}, Y_{avg}, Z_{avg}>$, where $X_{avg}$ is the average of X values of the calibrated samples, $Y_{avg}$ is the average of Y values of the calibrated samples, and $Z_{avg}$ is the average of Z values of the calibrated samples.

In a further embodiment, the effect of gravity is determined using the following equation:

$$E_G = \left| \frac{\langle X_{avg}, Y_{avg}, Z_{avg} \rangle}{norm} \right| - 1 \qquad \text{Equation 1}$$

In Equation 1, $<X_{avg}, Y_{avg}, Z_{avg}>$ is the average acceleration vector made up of average values of the samples in the X, Y, and Z axes; norm is the norm of the average acceleration vector, and $E_G$ is a value representing the effect of gravity.

Under normal operation, the effect of gravity should be low (for example, below a predetermined threshold). To this end, in some embodiments, if the value of $E_G$ is above a predetermined threshold (as a non-limiting example, 0.1), the sensor or sensors are recalibrated and the effect of gravity may be determined again in order to determine whether the new value for the effect of gravity is below a threshold. Execution may proceed when the effect of gravity is below a threshold, and new samples may be collected if needed. Checking whether the effect of gravity is below a threshold allows for ensuring that the sensors are properly calibrated before performing subsequent processing.

At S450, an estimated sensor attitude is updated based on the calibrated acceleration data. In an embodiment, the sensor attitude is updated using quaternions. To this end, in such an embodiment, updating the estimated sensor attitude includes determining a quaternion update, that is, an updated quaternion which represented an updated attitude of the sensor. In a further embodiment, such a quaternion is a representation of rotation derived from the characteristics of inner and outer products between vectors. Such a quaternion may be an attitude quaternion realized as a column vector of four parameters to describe a rotation along an axis. In an embodiment, the attitude quaternion is updated based on angular velocity data.

At S460, the acceleration data is transformed from a local frame to a world frame of an original coordinate system based on the updated attitude. That is, the acceleration data is transformed from a local reference frame for the body on which the sensor is disposed to a frame defined relative to the original coordinate system based on the updated attitude. To this end, the original coordinate system may be defined with respect to a set of initial coordinates of the sensors which captured the sensor signals used to determine the acceleration data. As a non-limiting example, an origin (point [0,0,0]) of the original coordinate system may be a position corresponding to the initial coordinates of the sensors.

In an embodiment, transforming the acceleration data from the local frame to the world frame includes updating a quaternion based on angular velocity signals received since a last quaternion was determined. That is, when a first acceleration vector is represented in quaternion space as a quaternion, a second acceleration vector also represented as a quaternion may be determined by updating a first quaternion of the first acceleration vector based on the angular velocity signals received between a time of collection of the acceleration values represented by the first acceleration vector and a time of collection of the acceleration values represented by the second acceleration vector in order to determine an updated quaternion of the second acceleration vector represented in the world frame.

To this end, in a further embodiment, transforming the acceleration data from the local frame to the world frame includes multiplying a new quaternion of a new acceleration vector (for example, the quaternion of the second acceleration vector) by the second acceleration vector in order to determine a first quaternion multiplication result. A conjugate of the new quaternion is determined, and the determined conjugate of the second quaternion is multiplied by the first quaternion result in order to determine a second quaternion multiplication result. The second quaternion multiplication result is a globalized acceleration vector which represents the updated quaternion of the new acceleration vector represented in the world frame.

At S470, one or more corrective actions are performed in order to effectively remove gravity from the acceleration data, thereby resulting in a set of gravity-compensated acceleration data. In an embodiment, the corrective actions include adjusting at least a portion of acceleration values among the acceleration data based on an effect of gravity (for example, the effect of gravity as determined at S440).

At S480, the acceleration data is corrected for tilt error. In an embodiment, correcting the acceleration data for tilt error includes building a master rotation matrix based on a set of Euler angles for a set of samples collected during an initial stationary period (for example, the samples collected during the initial stationary period as discussed above with respect to S310, S440, or both) and applying the master rotation matrix to the acceleration data in order to obtain a tilt error-corrected acceleration vector. In a further embodiment, the Euler angles at least include a roll and pitch determined based on the set of samples collected during the initial stationary period.

In yet a further embodiment, the roll and pitch are determined using the following equations:

$$\text{Roll} = \arctan\left(\frac{\alpha_y}{\alpha_z}\right) \qquad \text{Equation 2}$$

$$\text{Pitch} = -\arctan\left(\frac{\alpha_x}{\alpha_z}\right) \qquad \text{Equation 3}$$

In Equations 2 and 3, $a_x$, $a_y$, and $a_z$ are the mean offset acceleration values as determined with respect to an initial measurement of the effect of gravity in the X, Y, and Z axes, respectively. In at least some embodiments, yaw is assumed to be 0. In other embodiments, yaw may be calculated and used during subsequent processing.

In an embodiment, the roll and pitch are used to create rotation matrices $R_x$, $R_y$, and $R_z$ corresponding to the X, Y, and Z axes, respectively. The rotation matrices may be utilized to determine a master rotation matrix $T_{rotate}$. In a further embodiment, the master rotation matrix $T_{rotate}$ is determined using the following equation:

$$T_{rotate} = R_z * R_y * R_X \qquad \text{Equation 4}$$

In yet a further embodiment, the rotation matrices $R_x$, $R_y$, and $R_z$ are determined according to the following matrices:

$$R_X = \begin{array}{ccc} 1 & 0 & 0 \\ 0 & \cos(\text{roll}) & -\sin(\text{roll}) \\ 0 & \sin(\text{roll}) & \cos(\text{roll}) \end{array} \qquad \text{Matrix 1}$$

In an embodiment, the transpose of the gravity-compensated acceleration (for example, the gravity-compensated acceleration values determined as discussed above) is multiplied by the master rotation matrix $T_{rotate}$ in order to determine a set of tilt error-corrected acceleration values, thereby correcting for tilt error.

At S490, it is checked whether more samples need to be compensated for gravity and, if so, execution continues with S410; otherwise, execution terminates.

Figure 5:
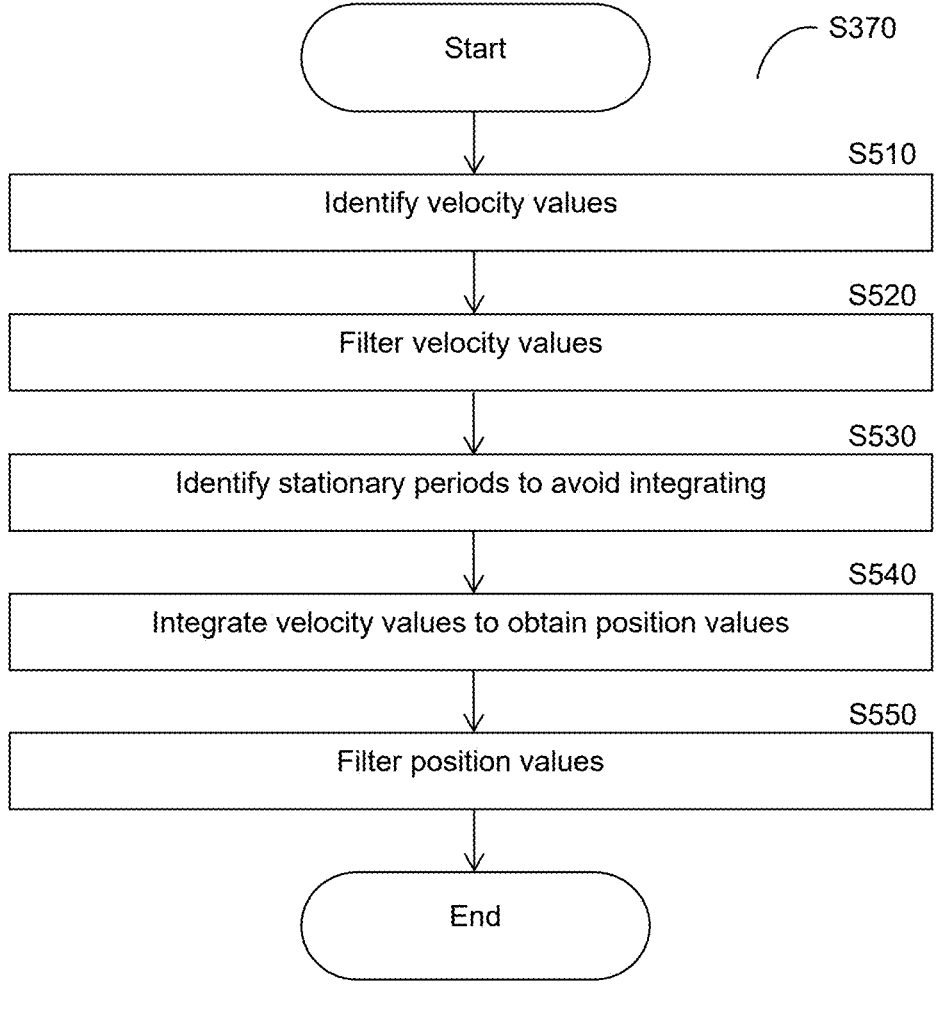
FIG. 5 is a flowchart illustrating a method for determining position values according to an embodiment.

FIG. 5 is a flowchart S370 illustrating a method for determining position values according to an embodiment.

At S510, velocity values to be used for determining the position values are identified. In an embodiment, the velocity values are among a set of velocity values determined by integrating acceleration values as discussed herein.

At S520, a second set of filters is applied to the velocity values. In an embodiment, the second set of filters includes a high-pass Butterworth filter. In another embodiment, the second set of filters includes a Madgwick filter.

An example process for filtering using a Madgwick filter which may be utilized at S520 in some embodiments is described further below with respect to FIG. 7.

At S530, stationary periods to avoid integrating are identified. In an embodiment, the stationary periods are identified as time periods corresponding to groupings of acceleration values which are determined to be stationary groupings, for example as discussed above. That is, velocity values determined by integrating acceleration values among stationary groupings of acceleration values may be identified as velocity values of stationary periods to avoid integrating. In other words, the stationary periods ignored during the previous integration of the acceleration values may likewise be ignored when integrating the velocity values.

At S540, at least a portion of the velocity values are integrated in order to obtain a set of position values. As noted above, in an embodiment, a portion of the velocity values is excluded from integration such that integration of those velocity values is avoided. In an embodiment, the integration of the velocity values is performed using a trapezoidal integration.

At S550, a third set of filters is applied to the set of position values in order to obtain a set of filtered position values. In an embodiment, the third set of filters includes a high-pass Butterworth filter.

It should be noted that FIGS. 3 and 5 are described with respect to three sets of filters, but that some disclosed embodiments are not necessarily limited as such. In some embodiments, a first phase of filtering using the first set of filters is performed on acceleration values (i.e., before integrating the acceleration values into velocity values) and a second phase of filtering using either the second set of filters or the third set of filters is performed after at least one integration of the acceleration values (i.e., on at least a portion of the velocity values or of the position values). That is, in such an embodiment, filtering is performed at least once before integrating the acceleration values and at least once after integrating the acceleration values. Moreover, in some embodiments, more than three sets of filters may be applied.

As noted above, applying filters to both acceleration values and the velocity values in a cascaded filtering approach before integrating into velocity values and position values, respectively, may allow for selectively integrating the values during periods of motion, which in turn prevents or otherwise reduces the accumulation of drift throughout the integration steps. That is, applying multiple phases of filtering may aid in further reducing error which may accumulate during the integration process.

Figure 6:
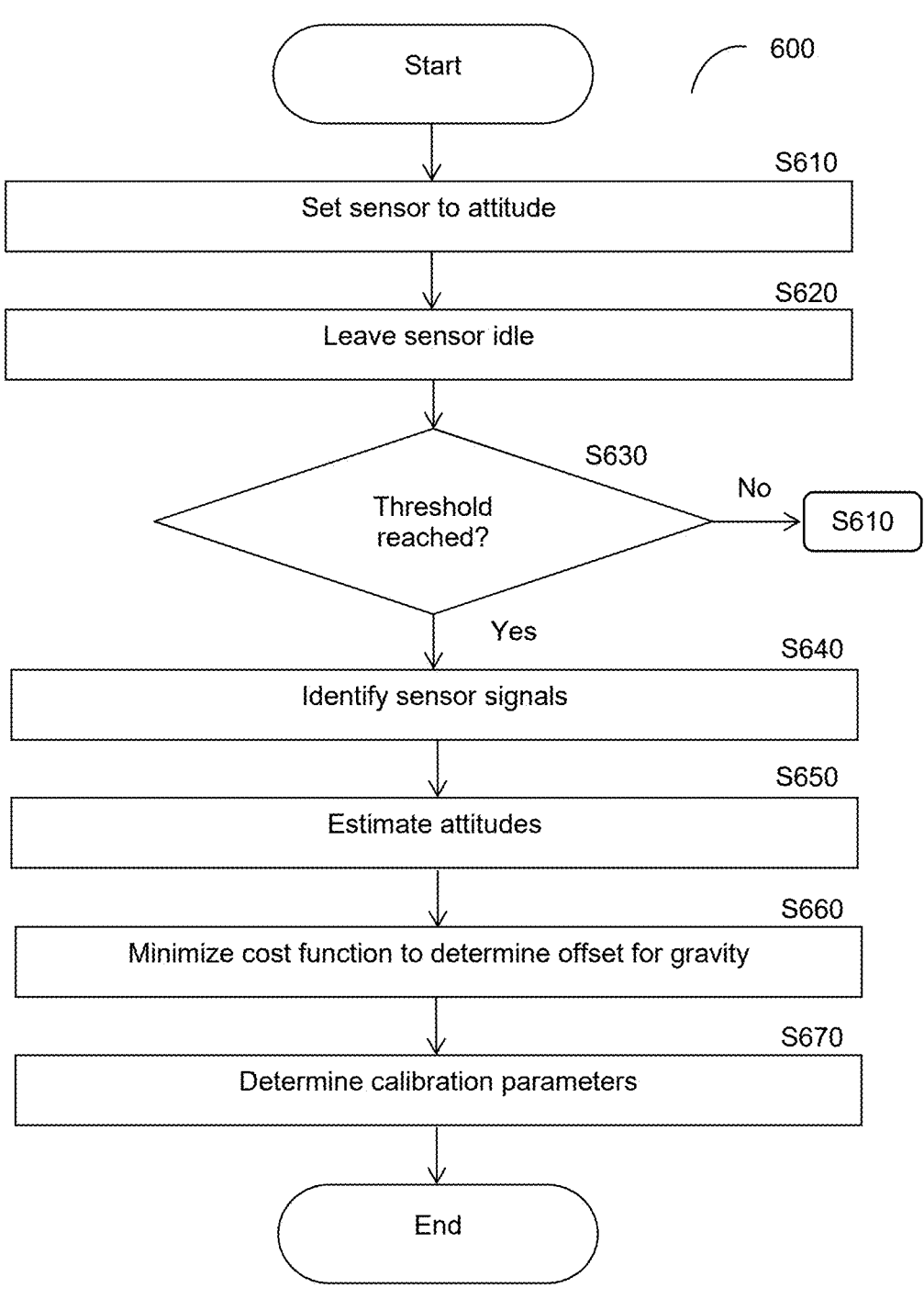
FIG. 6 is a flowchart illustrating a method for calibration according to an embodiment.

FIG. 6 is a flowchart 600 illustrating a method for calibration according to an embodiment. In an embodiment, the method is performed by the motion detection system 800, FIG. 8. Such a motion detection system may be installed in or otherwise deployed with respect to a wearable device such as, but not limited to, the wearable device 100, FIG. 1.

At S610, a sensor is set to an attitude. The attitude may be a predetermined attitude, or may otherwise be an attitude that allows the sensor to remain idle. That is, the sensor is set to an attitude where the sensor will not move when left idle. During a subsequent iteration of idling a sensor involving setting the sensor to different attitudes at each iteration, the sensor is set to an attitude that differs from the attitudes at prior iterations. In some embodiments, the sensor may be held at the attitude (for example, by an operator or held by a stand).

At S620, the sensor is left idle at the current attitude. In an embodiment, the sensor is left idle for a predetermined period of time.

At S630, it is determined if a threshold number of iterations of sensor idling has been reached and, if so, execution continues with S640; otherwise, execution returns to S610. In an embodiment, the threshold is a predetermined number of iterations, where each iteration includes setting the sensor to a different attitude from any previous iterations and leaving the sensor idle at that attitude for the predetermined period of time.

At S640, sensor signals are identified. The identified sensor signals include sensor signals captured while the sensor is left idle at different attitudes. The sensor signals may be or may include, but are not limited to, gyroscope and accelerometer signals.

At S650, representations of the attitude are estimated based on the sensor signals. In an embodiment, the representation of each attitude is realized as a quaternion.

Such a quaternion has a scalar component and a vector component. As a non-limiting example, a quaternion q may be represented in the form $q=a+bi+cj+dk$; where a, b, c, and d are real numbers; and i, j, and k are unit vectors pointing along three spatial axes. To this end, in yet a further embodiment, estimating the attitude for a sensor includes generating an attitude quaternion for the sensor based on the representation parameters. Each of the unit vectors may be defined using the representation parameters.

At S660, a cost function is minimized in order to determine an offset for gravity. In an embodiment, minimizing the cost function includes determining the total gravitational force in each orientation and finding a minimal cost value based on the attitude representations. Based on the minimal cost value, an offset for gravity is determined. In a further embodiment, the cost function subtracts a value representing gravity from the attitude representation for each attitude.

At S670, calibration parameters for calibrating the sensor are determined based on the determined offset for gravity. As noted above, the calibration parameters may be utilized to calibrate the sensor, and may also be utilized to correct acceleration values in order to improve accuracy. In an embodiment, the calibration parameters include a bias, for example, a bias in 3D space (for example, in the x, y, and z axes).

Figure 7:
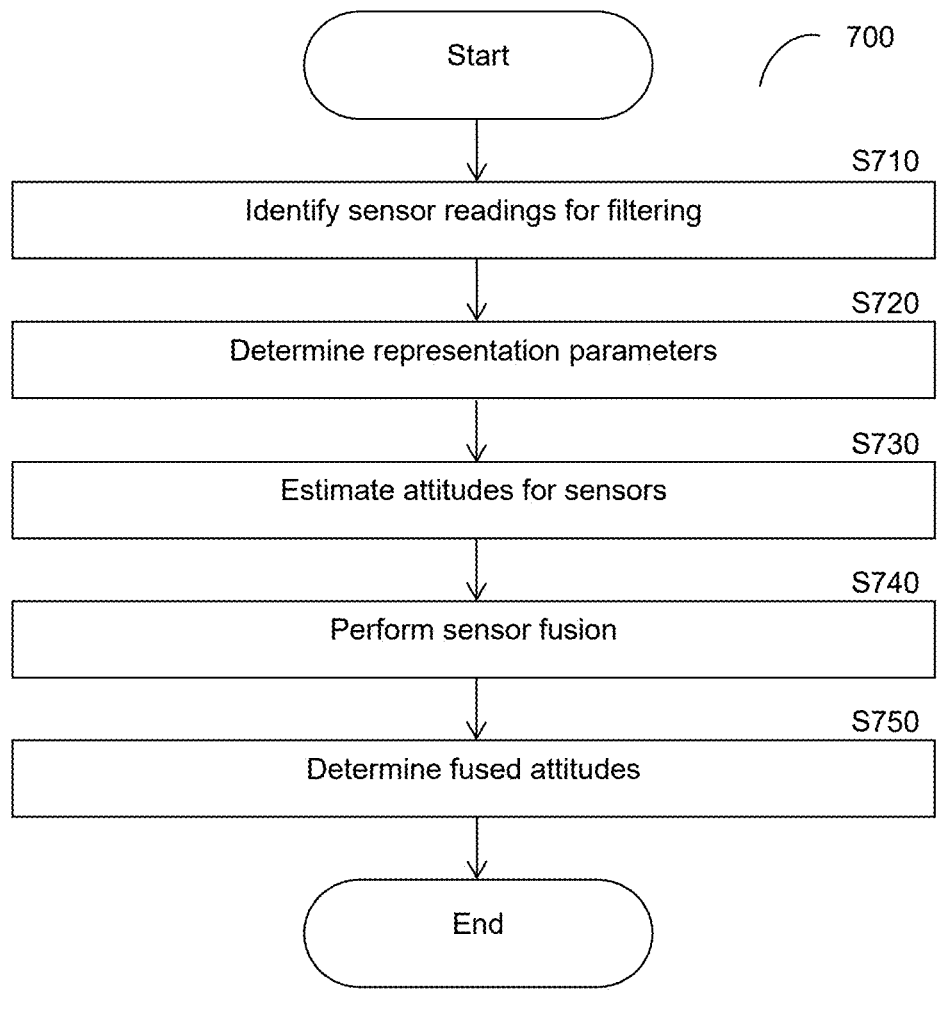
FIG. 7 is a flowchart illustrating a method for filtering using sensor fusion according to an embodiment.

FIG. 7 is a flowchart 700 illustrating a method for filtering using sensor fusion according to an embodiment. The method of FIG. 7 may be utilized in order to perform at least a portion of filtering as discussed herein. In an embodiment, the method is performed by the motion detection system 800, FIG. 8. Such a motion detection system may be installed in or otherwise deployed with respect to a wearable device such as, but not limited to, the wearable device 100, FIG. 1.

At S710, sensor readings form multiple sensors to be filtered are identified. The sensor readings may be or may include acceleration data captured by sensors of, for example, but not limited to, an IMU. More specifically, the sensor readings may be or may include gyroscope readings, and may further include accelerometer readings, magnetometer readings, or both.

At S720, representation parameters for the sensor readings are determined based on the sensor readings. In an embodiment, the representation parameters are defined in quaternion space. To this end, the representation parameters may be determined as values representing respective portions of a quaternion representation and may be determined based on the gyroscope readings.

At S730, attitudes are estimated for the sensors for different times (i.e., times at which respective portions of the sensor readings were captured). In an embodiment, the attitudes are represented in quaternion space. Accordingly, in such an embodiment, the attitude for a given sensor is defined as a quaternion. Such a quaternion has a scalar component and a vector component. As a non-limiting example, a quaternion q may be represented in the form $q=a+bi+cj+dk$; where a, b, c, and d are real numbers; and i, j, and k are unit vectors pointing along three spatial axes. To this end, in yet a further embodiment, estimating the attitude for a sensor includes generating an attitude quaternion for the sensor based on the representation parameters. Each of the unit vectors may be defined using the representation parameters.

At S740, sensor fusion is performed in order to filter sensor readings from the different sensors. In an embodiment, the sensory fusion includes using angular velocity data among the gyroscope data in order to update the attitude quaternions based on changes over time. In a further embodiment, the angular velocity data is used by integrating the angular velocity data in order to determine an orientation change (for example, an orientation change since a most recent previous time), and then updating each quaternion.

In an embodiment, performing the sensor fusion further includes applying a gradient descent algorithm to correct gyroscope measurement errors. In this regard, it is noted that raw gyroscope data tends to have a high frequency of noise and that accelerometer data, magnetometer data, or both may be utilized to determine a gyroscope measurement error and to correct such error by applying a gradient descent algorithm to the gyroscope data with respect to the determined gyroscope measurement error. Applying the gradient descent algorithm may include, but is not limited to, iteratively adjusting the orientation estimations among the representation parameters until the error is minimized (for example, below a predetermined threshold amount or proportion).

At S750, a set of fused attitudes is determined. In an embodiment, the set of fused attitudes is or includes the updated quaternions for different times. Accordingly, the quaternions effectively represent the acceleration in 3D space of the sensors at different points in time, corrected by combining data from the sensors.

Figure 8:
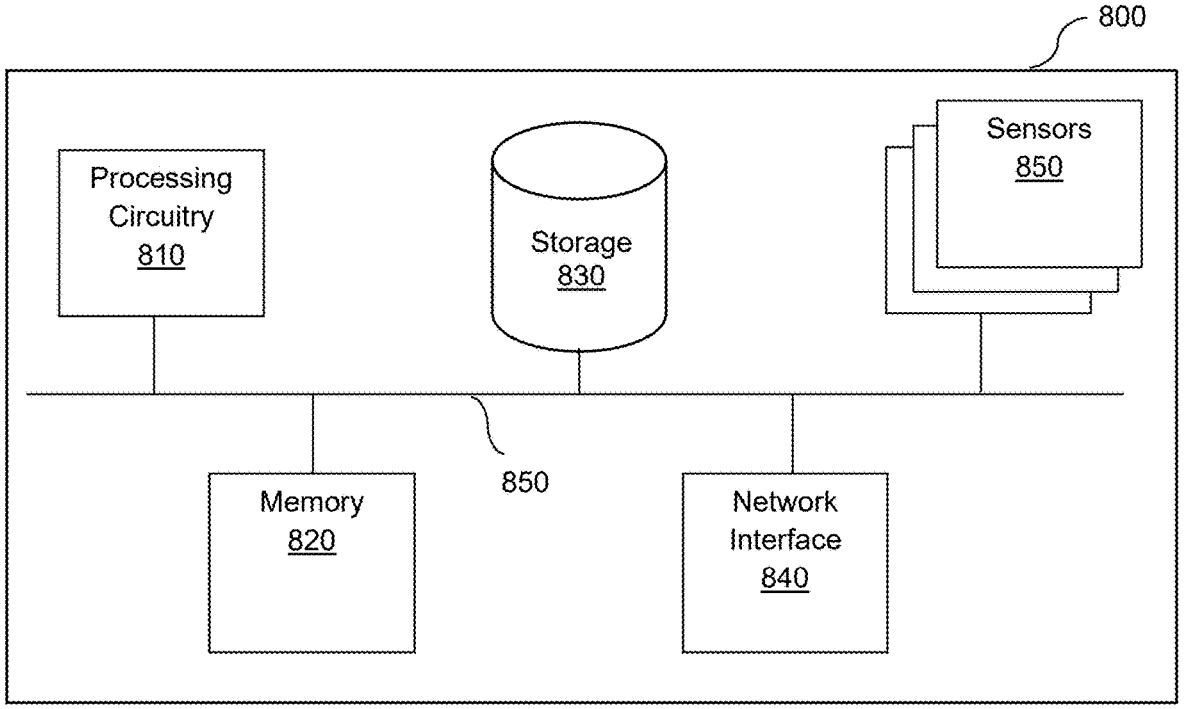
FIG. 8 is a schematic diagram of a motion detection system according to an embodiment.

FIG. 8 is a schematic diagram of a motion detection system 800 according to an embodiment. The motion detection system 800 may be a computing layer of a wearable device such as, but not limited to, the wearable device 100, FIG. 1.

The motion detection system 800 includes a processing circuitry 810 coupled to a memory 820, a storage 830, and a network interface 840. In an embodiment, the components of the motion detection system 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the motion detection system 800 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for position detection, comprising:
identifying a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data;
determining a plurality of velocity values by integrating a portion of the plurality of acceleration values, wherein the portion of the plurality of acceleration values which is integrated in order to determine the plurality of velocity values excludes the plurality of stationary periods, wherein excluding the plurality of stationary periods having acceleration magnitude values below the threshold when integrating the portion of the plurality of acceleration values removes noise and drift; and
determining a plurality of positions by integrating at least a portion of the plurality of velocity values.

2. The method of claim 1, further comprising:
applying a first set of filters to the plurality of sample groupings in order to create a set of filtered sample groupings, wherein the plurality of stationary periods is identified based further on the set of filtered sample groupings.

3. The method of claim 2, wherein the first set of filters includes a high-pass Butterworth filter and a low-pass Butterworth filter.

4. The method of claim 2, further comprising:
applying a second set of filters to the plurality of velocity values in order to obtain a set of filtered velocity values, wherein the at least a portion of the plurality of velocity values is the set of filtered velocity values.

5. The method of claim 1, further comprising:
removing offset bias from the plurality of samples in order to produce a plurality of bias-corrected acceleration values by determining an averaged acceleration value of a subset of the plurality of samples and subtracting the averaged acceleration value from the plurality of acceleration values, wherein the portion of the plurality of acceleration values is the plurality of bias-corrected acceleration values.

6. The method of claim 1, wherein the sensor data is captured by at least one sensor, further comprising:

measuring an effect of gravity upon the sensor data during a stationary period, wherein the at least one sensor is stationary during the stationary period; and adjusting the plurality of acceleration values based on the effect of gravity in order to create a set of gravity-compensated acceleration values, wherein the portion of the plurality of acceleration values is the set of gravity-compensated acceleration values.

7. The method of claim 1, wherein identifying the plurality of stationary periods further comprises:

creating an acceleration vector for each of the plurality of sample groupings; and determining a magnitude of the acceleration vector for each of the plurality of sample groupings, wherein each stationary period is one of the plurality of groupings for which the magnitude of the acceleration vector is below a predetermined threshold.

8. The method of claim 1, further comprising:

generating a three-dimensional motion trajectory based on the plurality of positions.

9. The method of claim 8, further comprising:

generating at least one form correction output by comparing the generated three-dimensional motion trajectory to at least one target motion trajectory.

10. The method of claim 1, wherein the threshold is 0.025 meters/second squared.

11. A non-transitory computer-readable medium having stored thereon instructions for causing a processing circuitry to execute a process, the process comprising:

identifying a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data;

determining a plurality of velocity values by integrating a portion of the plurality of acceleration values, wherein the portion of the plurality of acceleration values which is integrated in order to determine the plurality of velocity values excludes the plurality of stationary periods, wherein excluding the plurality of stationary periods having acceleration magnitude values below the threshold when integrating the portion of the plurality of acceleration values removes noise and drift; and determining a plurality of positions by integrating at least a portion of the plurality of velocity values.

12. The non-transitory computer-readable medium of claim 11, wherein the threshold is 0.025 meters/second squared.

13. A system for position detection, comprising:

a processing circuitry; and a memory, the memory containing instructions that, when executed by the processing circuitry, configure the system to:

identify a plurality of stationary periods based on a plurality of sample groupings including a plurality of acceleration values, wherein each stationary period is a sample grouping of the plurality of sample groupings having an acceleration magnitude value below a threshold, wherein each sample grouping includes a subset of samples from among a plurality of samples of sensor data;

determine a plurality of velocity values by integrating a portion of the plurality of acceleration values, wherein the portion of the plurality of acceleration values which is integrated in order to determine the plurality of velocity values excludes the plurality of stationary periods, wherein excluding the plurality of stationary periods having acceleration magnitude values below the threshold when integrating the portion of the plurality of acceleration values removes noise and drift; and determine a plurality of positions by integrating at least a portion of the plurality of velocity values.

14. The system of claim 13, wherein the system is further configured to:

apply a first set of filters to the plurality of sample groupings in order to create a set of filtered sample groupings, wherein the plurality of stationary periods is identified based further on the set of filtered sample groupings.

15. The system of claim 14, wherein the first set of filters includes a high-pass Butterworth filter and a low-pass Butterworth filter.

16. The system of claim 14, wherein the system is further configured to:

apply a second set of filters to the plurality of velocity values in order to obtain a set of filtered velocity values, wherein the at least a portion of the plurality of velocity values is the set of filtered velocity values.

17. The system of claim 13, wherein the system is further configured to:

remove offset bias from the plurality of samples in order to produce a plurality of bias-corrected acceleration values by determining an averaged acceleration value of a subset of the plurality of samples and subtracting the averaged acceleration value from the plurality of acceleration values, wherein the portion of the plurality of acceleration values is the plurality of bias-corrected acceleration values.

18. The system of claim 13, wherein the sensor data is captured by at least one sensor, wherein the system is further configured to:

measure an effect of gravity upon the sensor data during a stationary period, wherein the at least one sensor is stationary during the stationary period; and adjust the plurality of acceleration values based on the effect of gravity in order to create a set of gravity-compensated acceleration values, wherein the portion of the plurality of acceleration values is the set of gravity-compensated acceleration values.

19. The system of claim 13, wherein the system is further configured to:

create an acceleration vector for each of the plurality of sample groupings; and determine a magnitude of the acceleration vector for each of the plurality of sample groupings, wherein each stationary period is one of the plurality of groupings for which the magnitude of the acceleration vector is below a predetermined threshold.

20. The system of claim 13, wherein the system is further configured to:

generate a three-dimensional motion trajectory based on the plurality of positions.

21. The system of claim 20, wherein the system is further configured to:

generate at least one form correction output by comparing the generated three-dimensional motion trajectory to at least one target motion trajectory.

22. The system of claim 13, further comprising:

an inertial measurement unit, wherein the inertial measurement unit is configured to collect the plurality of samples.

23. The system of claim 13, wherein the system is disposed in a wearable device.

24. The system of claim 1, wherein the wearable device is an arm band.

25. The system of claim 1, further comprising:

a single six degree of freedom (DOF) inertial sensor, wherein the six DOF inertial sensor is configured to collect the plurality of samples.

26. The system of claim 13, further comprising:

a plurality of sensors, wherein the plurality of sensors includes an accelerometer and a gyroscope, wherein the sensor data is captured by the accelerometer and by the gyroscope.

27. The system of claim 26, wherein the plurality of sensors consists of the accelerometer and the gyroscope.

28. The system of claim 13, wherein the threshold is 0.025 meters/second squared.

\* \* \* \* \*